(12) United States Patent
Ziemer et al.

(10) Patent No.: US 12,291,304 B2
(45) Date of Patent: May 6, 2025

(54) GEAR SET ASSEMBLY AND BICYCLE GEARING SYSTEM

(71) Applicant: ZF Friedrichshafen AG, Friedrichshafen (DE)

(72) Inventors: Peter Ziemer, Bad Woerishofen (DE); Thomas Riedisser, Sigmarszell (DE); Hagen Doepfert, Lindau (DE); Ulrich Doerr, Constance (DE); Christoph Margraf, Markdorf (DE); Reinhard Deppert, Gochsheim (DE); Uwe Schraff, Markdorf (DE); Sebastian Grimm, Weil der Stadt (DE); Markus Strobel, Ravensburg (DE); Harald Tiesler, Uhldingen-Mühlhofen (DE); Matthias List, Friedrichshafen (DE); Rainer Grundler, Bodman-Ludwigshafen (DE); Ingo Lippenberger, Horgenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/682,584

(22) PCT Filed: Jul. 27, 2022

(86) PCT No.: PCT/EP2022/071032
§ 371 (c)(1),
(2) Date: May 7, 2024

(87) PCT Pub. No.: WO2023/016800
PCT Pub. Date: Feb. 16, 2023

(65) Prior Publication Data
US 2024/0359775 A1    Oct. 31, 2024

(30) Foreign Application Priority Data
Aug. 10, 2021  (DE) .......................... 102021208705.1

(51) Int. Cl.
*B62M 11/16* (2006.01)
*B62M 11/18* (2006.01)

(52) U.S. Cl.
CPC ............. *B62M 11/16* (2013.01); *B62M 11/18* (2013.01)

(58) Field of Classification Search
CPC ....... B62M 11/16; B62M 11/18; B62M 11/14; B62M 11/145
See application file for complete search history.

(56) References Cited

U.S. PATENT DOCUMENTS

| | | | | |
|---|---|---|---|---|
| 11,261,943 | B2* | 3/2022 | Ziemer | .................... B62M 6/55 |
| 11,649,009 | B2* | 5/2023 | Kaltenbach | ............. B62M 6/55 |
| | | | | 280/260 |
| 2019/0382080 | A1* | 12/2019 | Kaltenbach | ............ B62M 11/18 |

FOREIGN PATENT DOCUMENTS

| | | |
|---|---|---|
| DE | 102016225145 A1 | 6/2018 |
| DE | 102016225169 A1 | 6/2018 |

(Continued)

OTHER PUBLICATIONS

German Search Report for Application No. 102021208705.1 Dated Mar. 3, 2022.

*Primary Examiner* — Derek D Knight
(74) *Attorney, Agent, or Firm* — Dority & Manning, P.A.

(57) ABSTRACT

A gear set arrangement (10) for a bicycle gearbox (400) includes a planetary assembly, a stationary component (24), a first and a second brake (B1, B2), and a first and a second freewheel clutch (F1, F2). One planetary gear set (12) of the planetary assembly includes a first rotary element, a second rotary element, and a third rotary element. The first rotary element is rotationally fixable on the stationary component (24) by the first brake (B1). The first rotary element is connectable to the output (36) by the first freewheel clutch (F1). The second rotary element is rotationally fixable on the (Continued)

stationary component (24) by the second brake (B2). The second rotary element is connectable to the output (36) by the second freewheel clutch (F2). The third rotary element is connected to the input (34) for conjoint rotation. The gear set arrangement (10) is configured to provide three ratios.

9 Claims, 3 Drawing Sheets

(56) References Cited

FOREIGN PATENT DOCUMENTS

| | | | | |
|---|---|---|---|---|
| DE | 102018208380 A1 | | 11/2019 | |
| DE | 102018208387 A1 | * | 11/2019 | ·········· B62M 11/145 |
| DE | 102019208536 A1 | * | 12/2020 | ·········· B62M 11/145 |
| DE | 102020206299 A1 | * | 11/2021 | |
| DE | 102023202088 A1 | * | 9/2024 | ·········· B62M 11/145 |
| TW | 202012244 A | * | 4/2020 | ·········· B62M 11/145 |

* cited by examiner

| | B1 | B4 | B3 | B2 | F3 | F4 | F1 | F2 | i | j |
|---|---|---|---|---|---|---|---|---|---|---|
| G1 | – | – | – | – | ● | ● | ● | ● | 1,0 | 1,13 |
| G2 | – | – | ● | – | – | ● | ● | ● | 0,89 | 1,13 |
| G3 | – | ● | – | – | ● | – | ● | ● | 0,79 | 1,13 |
| G4 | – | ● | ● | – | – | – | ● | ● | 0,70 | 1,13 |
| G5 | ● | – | – | – | ● | ● | – | ● | 0,62 | 1,13 |
| G6 | ● | – | ● | – | – | ● | – | ● | 0,55 | 1,13 |
| G7 | ● | ● | – | – | ● | – | – | ● | 0,49 | 1,13 |
| G8 | ● | ● | ● | – | – | – | – | ● | 0,43 | 1,13 |
| G9 | – | – | – | ● | ● | ● | ● | – | 0,38 | 1,13 |
| G10 | – | – | ● | ● | – | ● | ● | – | 0,34 | 1,13 |
| G11 | – | ● | – | ● | ● | – | ● | – | 3,0 | 1,13 |
| G12 | – | ● | ● | ● | – | – | ● | – | 0,27 | |

GEAR SET ASSEMBLY AND BICYCLE GEARING SYSTEM

CROSS-REFERENCE TO RELATED APPLICATIONS

The present application is a U.S. national phase of PCT/EP2022/071032 filed on Jul. 27, 2022 and is related and has right of priority to German Patent Application No. DE102021208705.1 filed on Aug. 10, 2021, both of which are incorporated by reference in their entireties for all purposes.

TECHNICAL FIELD

The present invention relates generally to a gear set arrangement for a planetary gearbox of a bicycle. The invention also relates generally to a bicycle gearbox.

BACKGROUND

DE 10 2018 208 380 A1 describes a multi-stage gearbox of a planetary design for a bicycle or pedelec. These multi-stage gearboxes have three planetary gear sets or four planetary gear sets in order to provide eight gears or sixteen gears. One planetary gear set of the multi-stage gearbox, which is arranged at the front or at the rear in the torque flow as a front-mounted gear set or a rear-mounted gear set, can provide only two rotational speeds for changing a transmission ratio.

SUMMARY

A first example aspect of the invention relates to a gear set arrangement for a planetary gearbox of a bicycle. The planetary gearbox can be designed, for example, to be arranged in a bottom bracket of the bicycle. The gear set arrangement has a planetary assembly. The planetary assembly can include, for example, one or more planetary gear sets.

The gear set arrangement has a stationary component. In addition, the gear set arrangement has a first brake and a second brake. In addition, the gear set arrangement has a first freewheel clutch and a second freewheel clutch.

The stationary component can be, for example, a housing of the gearbox or even a portion of a bicycle frame. A stationary component can be, for example, a component which is immovable relative to the rotary elements of the gearbox. The stationary component can also be formed by multiple elements which are spaced apart from one another.

A brake can be an interlocking or friction-locking shift element. The respective brakes can be designed to prevent rotation of a rotary element connected thereto, or to reduce the rotation thereof, for example, to a stop. The respective brakes can be designed to connect a rotary element to the stationary component for conjoint rotation, without the rotary element being permanently connected to the stationary component for conjoint rotation, however. The connection or fixing can be established and released by the brake. The brakes can be actively actuated by a gear change device, for example, by a cable pull of a manual gearbox.

A freewheel clutch can be a clutch acting in only one direction of rotation. Two elements which are connectable to each other for conjoint rotation by a freewheel clutch are permanently connected to each other for conjoint rotation in one direction of rotation of these two elements relative to each other. Elements which are connected to each other for conjoint rotation run at the same rotational speed. In an opposite relative direction of rotation, which can also correspond to the driven element overriding the driving element, the two elements are not connected to each other by the freewheel clutch, but rather are decoupled from each other. When the relative direction of rotation reverses from a freewheel direction to a coupling direction, the freewheel clutch can automatically lock up. The freewheel clutch can be in the form, for example, of a pawl freewheel or a one-way roller clutch. A freewheel clutch can be a shift element which does not need to be actively engaged and disengaged. As a result, the gearbox can be nested to a greater extent and can be more compact. For example, a freewheel clutch is not actuated and, therefore, does not need to be accessible for actuation. As a result, a freewheel clutch in the gear set arrangement can be surrounded radially from the outside by a hollow shaft or another rotary element. The gear set arrangement can be designed such that a shift into a speed-increasing ratio or neutral is achieved in every gear from the input to the output. Respective freewheel clutches can be correspondingly oriented.

In the case of a friction-locking shift element such as a freewheel clutch or a brake, rotational speed differences between the components can exist even after these components have been engaged. This intentional or unintentional state is nevertheless referred to as a corotational connection of the respective components. In the case of a frictional connection, there can be a certain speed differential between the two interconnected elements, for example, due to slip.

The gear set arrangement is designed to provide three ratios. For example, the gear set arrangement can provide three different gears. These gears can be engaged, for example, by actuating respective brakes. For example, each gear provides a different transmission ratio. The freewheel clutches can automatically change state, and therefore freewheel clutches do not require active actuation for a gear ratio change. In each gear, there can be a fixed mechanical transmission ratio between the input and the output of the planetary gear set, so that additional gears can be provided with the bicycle gearbox. The gear set arrangement is therefore particularly suitable for forming a front-mounted gear set or a rear-mounted gear set in a bicycle gearbox in order to increase the overall gear ratio and, alternatively or additionally, the number of transmission gears using simple mechanisms. There can be a fixed mechanical transmission ratio between the input and output in each gear. The gear set arrangement can be designed to provide precisely three ratios by one planetary gear set.

The planetary assembly has one planetary gear set. The planetary gear set includes a first rotary element, which is in the form of a sun gear, a second rotary element and a third rotary element. The second element is in the form of a ring gear in the case of a negative planetary gear set and is in the form of a planet carrier in the case of a positive planetary gear set. The third element is in the form of a planet carrier in the case of a negative planetary gear set and is in the form of a ring gear in the case of a positive planetary gear set. A negative planetary gear set has a negative stationary gear ratio and a positive planetary gear set has a positive stationary gear ratio. Planet gears can be rotatably mounted on the planet carrier. Depending on the design, one gear set can have one set or multiple sets of planet gears. Respective planet gears of a planetary gear set can mesh with the ring gear and the sun gear of the planetary gear set. If there are multiple sets of planet gears, in addition, only the planet gears of one set can mesh with the sun gear and the planet gears of another set can mesh with the ring gear in each case.

Respective planet gears of the two planetary gear sets can then mesh with one another in pairs.

The planetary assembly has an input, at which, for example, the variable to be subjected to a transmission ratio change can be supplied to the gear set arrangement. The planetary assembly has an output, at which, for example, the variable, the transmission ratio of which has been changed by the gear set arrangement, can be output. The output can be mechanically operatively connected, for example, to a rear wheel of the bicycle, for example, by a bicycle chain or a belt. The gearbox can include an input shaft, which can form the input at one end. The output can be formed by an output shaft, which can be provided axially parallel or coaxial to the input. The output shaft can form the output at one end. The input of the planetary assembly can correspond to an input of the gearbox. Alternatively, the output of the planetary assembly can correspond to an output of the gearbox. The planetary assembly can be designed to transmit a torque from the input to the output. The transmission can take place with three different ratios. The gear set arrangement can be designed to transmit a torque.

Typically, a bicycle gearbox is designed to provide a drive torque in only one direction of rotation, since a bicycle is ridden only in the forward direction. In that respect, a bicycle gearbox already differs from typical motor vehicle transmissions. The gearbox can be designed, for example, to be unable to transmit torque in an opposite direction of rotation. For example, the bicycle gearbox is also unable to change a direction of rotation of the output in relation to the input, for example, by shifting an assembly which changes the direction of travel.

The first rotary element is rotationally fixable on the stationary component by the first brake. The first rotary element is connectable to the output for conjoint rotation by the first freewheel clutch. The second rotary element is rotationally fixable on the stationary component by the second brake. The second rotary element is connectable to the output for conjoint rotation by the second freewheel clutch. The third rotary element is permanently connected to the input for conjoint rotation. For example, the third rotary element can be bolted to the input or formed integrally therewith. The third rotary element and the input can be formed by a common shaft. The gear set arrangement is thus designed to provide three ratios between the input and the output. Only two actively actuatable shift elements in the form of brakes are necessary for this purpose, as a result of which the gear set arrangement can be compactly and easily integrated into a bicycle gearbox. A further planetary gear set is not necessary in order to provide additional gears in otherwise known bicycle gearboxes. Further planetary gear sets require greater effort and require more installation space, which can therefore be avoided.

The gear set arrangement can thus provide two instead of three ratios with a single planetary gear set. Both brakes are disengaged for a first ratio. The two freewheel clutches then operate in the blocking direction. A ratio can be, for example, one in this case. Engaging the first brake can effect a shift to a ratio which is higher in comparison thereto. The first freewheel clutch is then in the overrun operation state and the second freewheel clutch continues to operate in the blocking direction. Disengaging the first brake and engaging the second brake can effect a shift to a ratio which is even higher in comparison thereto. The first freewheel clutch then operates in the blocking direction and the second freewheel clutch is then in the overrun operation state.

In one example embodiment of the gearbox, it is provided that the planetary gear set is in the form of a negative planetary gear set. The second rotary element can be in the form of a ring gear. The third rotary element can be in the form of a planet carrier. In negative planetary gear sets, one set of planet gears is usually sufficient, which can yield advantages with respect to cost and friction. In the negative planetary gear set, respective planet gears of a planetary gear set can mesh with the ring gear and the sun gear of the negative planetary gear set. In addition, the planet carrier which is connected to the input can form a disk-shaped region, at which torque sensing is easily possible. The planet carrier can be formed integrally with the input, for example, as a common shaft. The planet carrier can also be, for example, permanently connected to the input for conjoint rotation.

In one example embodiment of the gearbox, it is provided that the planetary gear set is in the form of a positive planetary gear set. The second rotary element can be in the form of a planet carrier. The third rotary element can be in the form of a ring gear. The positive planetary gear set can have two sets of planet gears. The planet gears of one set can mesh with the sun gear, and the planet gears of another set can mesh with the ring gear. Respective planet gears of the two sets of planet gears can then mesh with one another in pairs.

In one example embodiment of the gearbox, it is provided that the sun gear is divided. The sun gear can be interrupted in an axial direction. The sun gear can have a first sun gear element and a second sun gear element. The two sun gear elements can be, for example, identical. Other rotary elements can be formed as one piece and, alternatively or additionally, undivided. The divided sun gear can enable the planet carrier to be connected to the input radially on the inside in the design with the negative planetary gear set. The gear set arrangement can thus be particularly compact. In addition, the planet carrier can therefore be easily connected to the input despite the design as a negative planetary gear set. The respective planet gears of the negative planetary gear set can mesh, for example, with both sun gear elements.

In one example embodiment of the gearbox, it is provided that the ring gear is divided. The ring gear can be interrupted in an axial direction. The ring gear can therefore have a first ring gear element and a second ring gear element. The two ring gear elements can be, for example, identical. Other rotary elements can be formed as one piece and, alternatively or additionally, undivided. The divided ring gear can enable the planet carrier to be connected to the input radially on the outside in the design with the negative planetary gear set. Thus, the planet carrier can have a disk-shaped region which is arranged axially externally. Torque sensing is easily possible in this design. The respective planet gears of the negative planetary gear set can mesh, for example, with both ring gear elements.

In one example embodiment of the gearbox, it is provided that the first brake and the second brake are designed to be simultaneously actuatable in order to lock the planetary assembly. In the locked state, for example, all rotary elements of a planetary gear set can be prevented from rotating. The locked planetary assembly cannot transmit torque. As a result, theft protection and, alternatively or additionally, immobilization can be provided. This function can therefore be provided in addition to the three gears, each having a different ratio, as a further engagement state of the gear set arrangement.

Alternatively, the first brake and the second brake can be in the form, for example, of a double shift element, which are only alternately actuatable. As a result, the actuation can be particularly easy and, in addition, the gear set arrangement can be particularly compact.

In one example embodiment of the gearbox, it is provided that the first freewheel clutch is designed to automatically switch to the locking direction state when the second brake is engaged. The first freewheel clutch is designed to automatically switch to the overrun operation state when the first brake is engaged. If the brakes are engaged the other way around, the freewheel clutches can be in a state which is the other way around. For example, when the first brake is disengaged, the first freewheel clutch can automatically switch to the locking direction state.

In one example embodiment of the gearbox, it is provided that the second freewheel clutch is designed to automatically switch to the locking direction state when the first brake is engaged. The second freewheel clutch can be designed to automatically switch to the overrun operation state when the second brake is engaged. If the brakes are engaged the other way around, the freewheel clutches can be in a state which is the other way around.

The gear set arrangement can be free of further planetary gear sets. The respective gear sets can be free of further elements such as further ring gears, planet carriers, planet gears and sun gears. For example, the planetary assembly and the gearbox in one example embodiment have no further planetary gear sets other than the planetary gear sets described here. Similarly, the gear set arrangement in one example embodiment can have no further spur gear stages other than the respective spur gear stages described here. With respect to the gear set arrangement and the gearbox, it can be provided that its entire planetary assembly or at least all planetary gear sets together are in the form of a planet wheel drum and, therefore, has only coaxial elements.

A second example aspect of the invention relates to a bicycle gearbox. The bicycle gearbox has a gear set arrangement according to the first example aspect. Respective further features, example embodiments and advantages are found in the descriptions of the first example aspect.

The bicycle gearbox can have an input and an output. The bicycle gearbox can have a main gear set, which is connected in series to the gear set arrangement for torque transmission. The main gear set can include one or more planetary gear set(s). The bicycle gearbox can be designed to transmit a torque from the input to the output via the respective gear sets. The input of the gear set arrangement can be, for example, permanently connected to the input of the bicycle gearbox for conjoint rotation or form the input of the bicycle gearbox. Alternatively, the output of the gear set arrangement can be, for example, permanently connected to the output of the bicycle gearbox for conjoint rotation or form the output of the bicycle gearbox. In order to transmit a torque, it can be necessary that one or more shift element (s) and, alternatively or additionally, brakes must be actuated.

The main gear set can be designed, for example, as follows. The main gear set can have at least one input and at least one output. The gear set arrangement can be connected to the input or the output of the main gear set for torque transmission. The main gear set can include a first planetary gear set and a second planetary gear set. The second planetary gear sets can be in the form of negative planetary gear sets. The first planetary gear set can include a first sun gear, a first planet carrier and a first ring gear. The second planetary gear set can include a second sun gear, a second planet carrier and a second ring gear. Respective planet carriers can include one or more planet gears rotatably mounted thereon, the planet gears meshing with the respective sun gear and the respective ring gear of the planetary gear set.

The numbering of the rotary elements and of the planetary gear sets can used merely for the purpose of assignment. In that respect, first rotary elements can be part of the first planetary gear set, and second rotary elements can be part of the second planetary gear set. Correspondingly, the first planetary gear set can include a first set of planet gears, which can also be referred to as first planet gears. Correspondingly, the second planetary gear set can include a second set of planet gears, which can also be referred to as second planet gears.

In addition, the bicycle gearbox can include a third brake, a fourth brake, a third freewheel clutch and a fourth freewheel clutch, in order to engage respective gear stages of the main gear set. The numbering is also used here merely for the purpose of assignment. The entire bicycle gearbox can therefore have four brakes and four freewheel clutches. In addition, the bicycle gearbox can have the main gear set and the gear set arrangement or three planetary gear sets.

The input of the bicycle gearbox can be connected to the first planet carrier for conjoint rotation. The first planet carrier can therefore form the input of the main gear set. The first ring gear can be permanently connected to the third rotary element of the gear set arrangement and, therefore, to its input, for conjoint rotation. The first sun gear can be permanently connected to the second planet carrier for conjoint rotation. The input of the bicycle gearbox and the first planet carrier are connectable to the second sun gear for conjoint rotation by the third freewheel clutch. The second sun gear is rotationally fixable on the stationary component by the third brake. The second ring gear is rotationally fixable on the stationary component by the fourth brake. The second ring gear is connectable to the third rotary element of the gear set arrangement and, thus, its input, by the fourth freewheel clutch. In this example, the input of the main gear set forms the input of the bicycle gearbox, and the output of the gear set arrangement forms the output of the bicycle gearbox. The main gear set is therefore arranged on the input side with respect to the gear set arrangement. A reverse connection in series and in the torque flow is also possible, however.

Respective planetary gear sets can be free of additional elements, which are not described. The bicycle gearbox can be free of additional planetary gear sets, shift elements and brakes, which are not described.

The bicycle gearbox can include a gear change device. The gear change device can include, for example, a cable pull and a shift lever, so that, for example, the cable pull can be pulled in order to shift. The gear change device can also include electric servomotors for actuating respective brakes. For example, the gear change device can include a control device having a microcontroller.

In one example embodiment, it is provided that the gearbox includes an electric motor. By the electric motor, for example, a torque which can be generated by the electric motor can be provided at the output of the bicycle gearbox and, alternatively or additionally, at the input of the bicycle gearbox. The bicycle gearbox can also be in the form of a drive device having an electric motor. The gearbox with the electric motor can allow for a motor-assisted bicycle and, for example, be used in a pedelec. The electric motor can be designed to convert electrical energy into a drive torque. The bicycle gearbox can also include a control device and a power supply, such as a battery, for the electric motor.

In one example embodiment, it is provided that the bicycle gearbox includes a pedal crankshaft. The bicycle gearbox can be designed such that a torque is transmittable from the pedal crankshaft to the input of the bicycle gearbox. The pedal crankshaft can be mounted, for example, in a bottom bracket shell of the bicycle. The pedal crankshaft can be designed, for example, such that, at the pedal crankshaft, respective cranks with pedals are movable, at least partially by muscle power, for driving the bicycle. The pedal crankshaft can be, for example, permanently mechanically operatively connectable to the input or permanently mechanically operatively connected to the input. For example, the input of the bicycle gearbox can be formed by the same shaft, such as the pedal crankshaft. The pedal crankshaft can be in the form of the input. The pedal crankshaft can also, for example, be connected or connectable to the input by another shift element such as a freewheel clutch and, alternatively or additionally, a spur gear stage. The pedal crankshaft can extend axially on a central rotational axis of the bicycle gearbox centrally completely through the gearbox.

The gearbox can include a torque sensor. The torque sensor can be designed to detect a torque which is applied at the pedal crankshaft. The torque sensor can be designed, alternatively or additionally, to detect a torque which is applied at the input of the bicycle gearbox. The gears and, alternatively or additionally, a drive power of the electric motor can be controlled by an open-loop system, for example, depending on respective detected torques.

DETAILED DESCRIPTION

Figure 1:
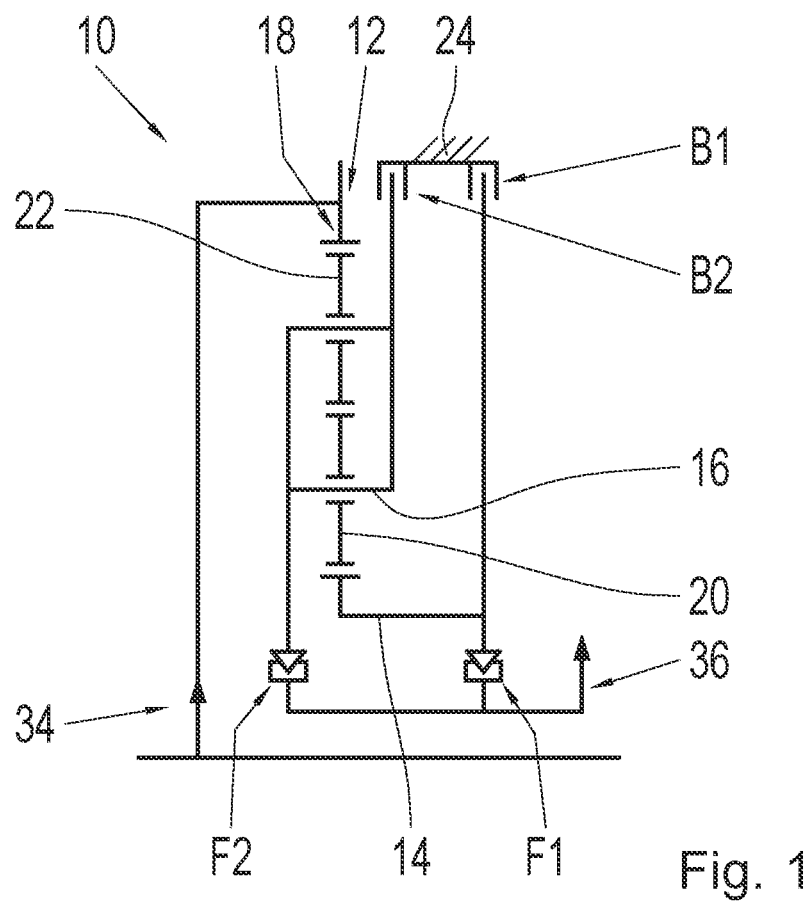
FIG. 1 shows a schematic view of a first example embodiment of a gear set arrangement for a planetary gearbox of a bicycle, the gear set arrangement having a positive planetary gear set.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a first example embodiment of a gear set arrangement 10. The gear set arrangement 10 includes a planetary gear set 12, which is in the form of a positive planetary gear set. The planetary gear set 12 includes a sun gear 14, a planet carrier 16 and a ring gear 18. A radially inner set of planet gears 20 and a radially outer set of planet gears 22 are rotatably mounted on the planet carrier 16. The radially inner planet gears 20 mesh with the sun gear 14. The radially outer planet gears 22 mesh with the ring gear 18. The radially inner planet gears 20 mesh in pairs with the radially outer planet gears 22.

The gear set arrangement 10 also includes a stationary component 24, a first brake B1, a second brake B2, a first freewheel clutch F1 and a second freewheel clutch F2. An input 34 of the gear set arrangement 10 is formed by a central shaft and is permanently connected to the ring gear 18 for conjoint rotation. An output 36 of the gear set arrangement 10 is formed by a hollow shaft which is arranged radially outward with respect to the gear set arrangement 10.

The sun gear 14 is rotationally fixable on the stationary component 24 by the first brake B1. The planet carrier 16 is rotationally fixable on the stationary component 24 by the second brake B2. The sun gear 14 is connectable to the output 36 for conjoint rotation by the first freewheel clutch F1. The planet carrier 16 is connectable to the output 36 for conjoint rotation by the second freewheel clutch F2.

A first gear stage results, in which the first brake B1 and the second brake B2 are disengaged. If a torque is applied at the input 34, the first freewheel clutch F1 and the second freewheel clutch F2 switch to the locking direction state. The planetary gear set 12 is thus interlocked and the output 36 rotates at the same speed as the input 34. When the planet carrier 16 is then held by the second brake B2, the second freewheel clutch F2 automatically switches to the overrun operation state.

Therefore, only the sun gear 14 is still connected to the output 36 by the first freewheel clutch F1 and an input variable is geared up. When the sun gear 14 is instead held by the first brake B1, the first freewheel clutch F1 automatically switches to the overrun operation state. Therefore, only the planet carrier 16 is still connected to the output 36 by the second freewheel clutch F2 and an input variable is also geared up. Therefore, three gear stages are provided. In addition, in one further state, the first brake B1 and the second brake B2 are engaged. As a result, the planetary gear set is locked and theft protection is achieved.

As is apparent in FIG. 1, the connection of the input 34 and the ring gear 18—the connection being formed as part of the ring gear 18—encloses the planetary gear set 12 on the input side and extends radially in the shape of a disk on an input-side axial end of the planetary gear set 12. Torque sensing can be easily connected there.

Figure 2:
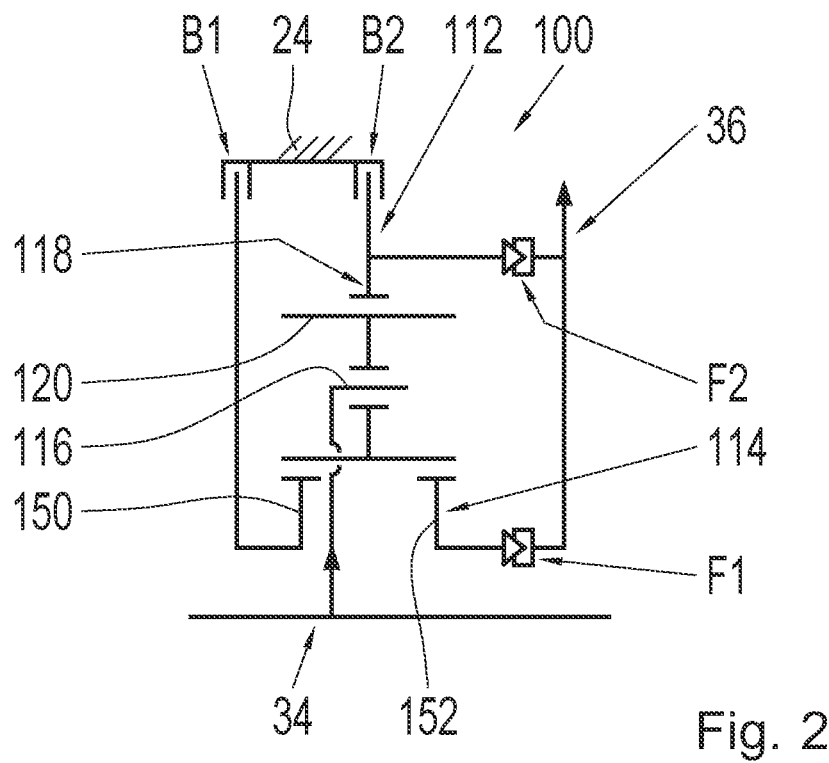
FIG. 2 shows a schematic view of a second example embodiment of a gear set arrangement for a planetary gearbox of a bicycle, the gear set arrangement having a negative planetary gear set.

FIG. 2 shows a schematic view of a second example embodiment of a gear set arrangement 100. The gear set arrangement 100 is identical to the first example embodiment in terms of function and has the same engagement states. Therefore, only relevant differences will be explained. The gear set arrangement 100 has a differently designed planetary gear set 112. The planetary gear set 112 is in the form of a negative planetary gear set. The planetary gear set 112 includes a sun gear 114, a planet carrier 116 and a ring gear 118. Only one set of planet gears 120 is rotatably mounted on the planet carrier 116. The planet gears 120 mesh with the sun gear 114 and with the ring gear 118.

In the gear set arrangement 100, the planet carrier 116 is permanently connected to the input 34 for conjoint rotation. The sun gear 114 is formed in two pieces for this purpose. The sun gear 114 includes an axially input-side first sun gear element 150 and an axially output-side second sun gear element 152. Both sun gear elements 150, 152 mesh with the planet gears 120, the tooth systems of which have a corresponding axial extension. The radially extending connection of the input 34 to the planet carrier 116 is arranged axially between the first sun gear element 150 and the second sun gear element 152.

The sun gear 114 is rotationally fixable on the stationary component 24 by the first brake B1. The ring gear 118 is rotationally fixable on the stationary component 24 by the second brake B2. The sun gear 114 is connectable to the output 36 for conjoint rotation by the first freewheel clutch F1. The ring gear 118 is connectable to the output 36 for conjoint rotation by the second freewheel clutch F2.

Figure 3:
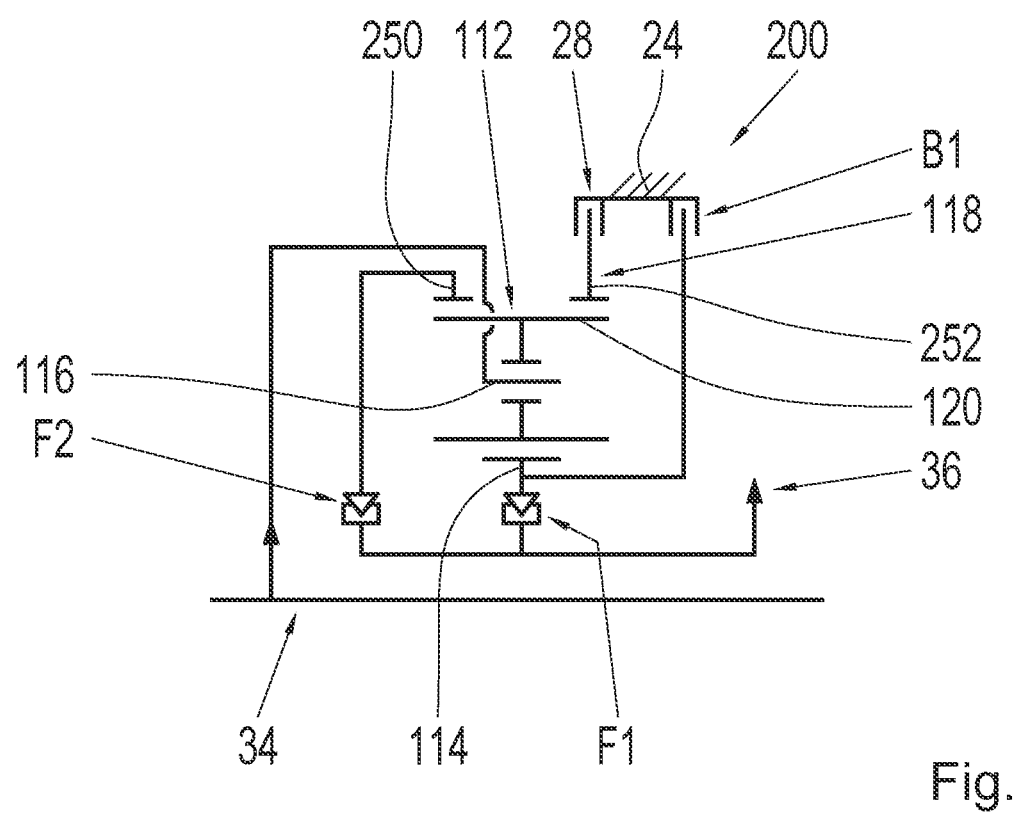
FIG. 3 shows a schematic view of a third example embodiment of a gear set arrangement for a planetary gearbox of a bicycle, the gear set arrangement also having a negative planetary gear set.

FIG. 3 shows a schematic view of a third example embodiment of a gear set arrangement 200. The gear set arrangement 200 is identical to the second example embodiment in terms of function and has the same engagement states and also includes a planetary gear set 112 which is in the form of a negative planetary gear set. Therefore, only relevant differences will be explained.

With respect to the planetary gear set 112 of the third example embodiment, the input 34 is permanently connected to the planet carrier 116 for conjoint rotation radially from the outside, instead of radially from the inside as in the second example embodiment. Correspondingly, the sun gear 114 in the third example embodiment is formed in one piece and the ring gear 118 is formed in two pieces. The ring gear 118 in the third example embodiment includes an axially input-side first ring gear element 250 and an axially output-side second ring gear element 252. Both ring gear elements 250, 252 mesh with the planet gears 120, the tooth systems of which have a corresponding axial extension. The radially extending connection of the input 34 to the planet carrier 116 is arranged axially between the first ring gear element 250 and the second ring gear element 252.

The connection of the input 34 and the planet carrier 116 in the third example embodiment—the connection being formed as part of the planet carrier 116—encloses the planetary gear set 112 on the input side and extends radially in the shape of a disk on an output-side axial end of the planetary gear set 112. Torque sensing can be easily connected there.

Figures 4, 5:
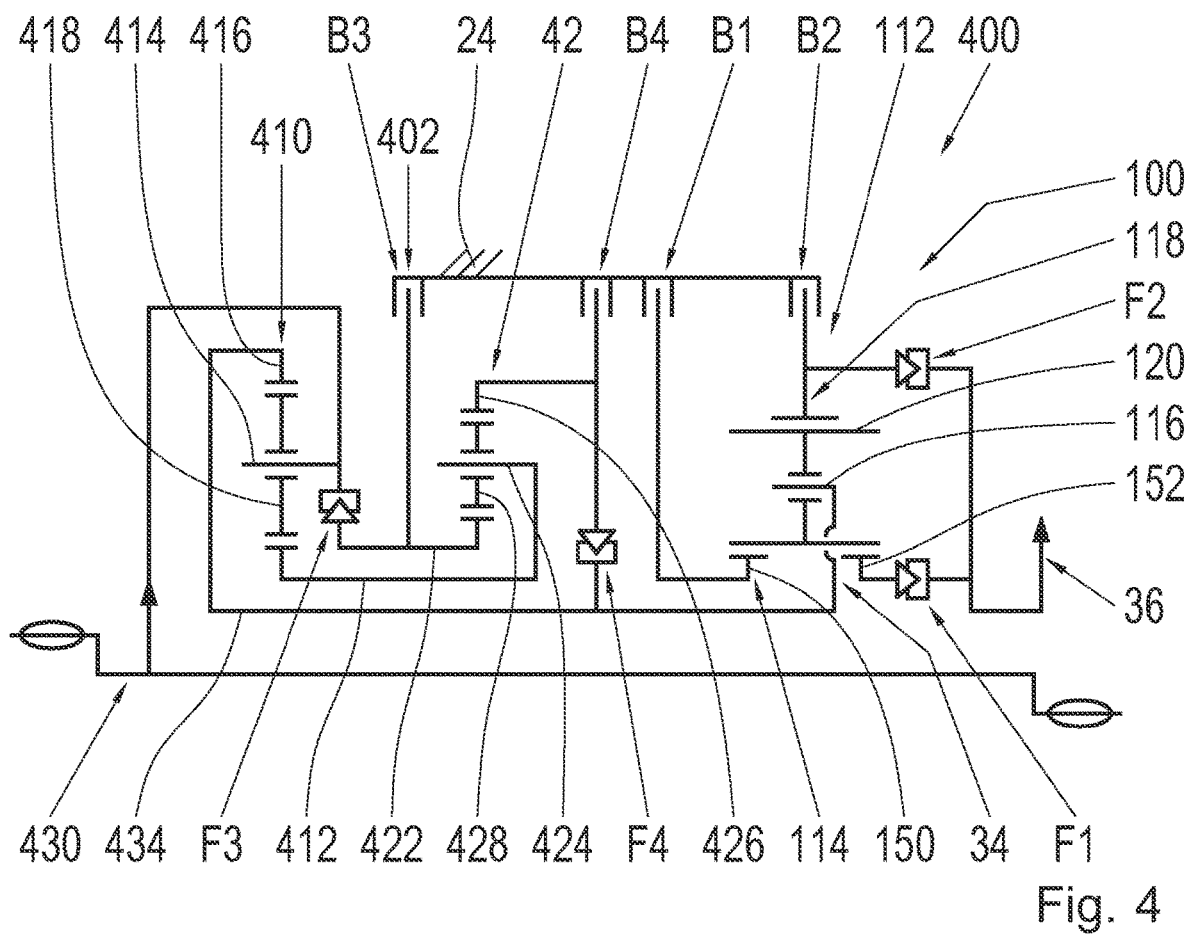
FIG. 4 shows a schematic view of a bicycle gearbox which has a gear set arrangement according to FIG. 1.
FIG. 5 illustrates a shift logic of the gearbox according to FIG. 4.

FIG. 4 shows a schematic view of a bicycle gearbox 400 having a gear set arrangement 100 according to the first example embodiment, the gear set arrangement 100 being arranged downstream from a main gear set 402 of the bicycle gearbox 400 in the torque flow. Instead of the gear set arrangement 100 according to the first example embodiment, the gear set arrangement 10 or the gear set arrangement 200 are installed in other example embodiments. In addition, the bicycle gearbox 400 includes a main gear set 402, a third brake B3, a fourth brake B4, a third freewheel clutch F3 and a fourth freewheel clutch F4.

The main gear set 402 includes a first planetary gear set 410 and a second planetary gear set 420. The first planetary gear set 410 includes a first sun gear 412, a first planet carrier 414 and a first ring gear 416. First planet gears 418 are rotatably mounted on the first planet carrier 414, the planet gears 418 meshing with the first sun gear 412 and the first ring gear 416. The second planetary gear set 420 includes a second sun gear 422, a second planet carrier 424 and a second ring gear 426. Second planet gears 428 are rotatably mounted on the second planet carrier 424, the planet gears 428 meshing with the second sun gear 422 and the second ring gear 426. Both planetary gear sets 410, 420 of the main gear set 402 are in the form of minus planetary gear sets.

The first planet carrier 414 is permanently connected to an input 430 of the bicycle gearbox 400 for conjoint rotation, the bicycle gearbox 400 being in the form of a pedal crankshaft. The first sun gear 412 is permanently connected to the second planet carrier 424 for conjoint rotation. The first planet carrier 414 is connectable to the second sun gear 422 for conjoint rotation by the third freewheel clutch F3. The first ring gear 416 is connected to the planet carrier 116 of the gear set arrangement 100 via a hollow shaft 434 which forms the input 34 of the gear set arrangement 100. The second sun gear 422 is rotationally fixable on the stationary component 24 by the third brake B3. The second ring gear 426 is rotationally fixable on the stationary component 24 by the fourth brake B4. In addition, the second ring gear 426 is connectable to the hollow shaft 434 and, therefore, to the planet carrier 116 of the gear set arrangement 100 for conjoint rotation by the fourth freewheel clutch F4.

The output 36 of the gear set arrangement 100 also forms the output of the bicycle gearbox 400. The output 36 is connectable to a rear wheel of a bicycle for torque transmission.

FIG. 5 illustrates a shift logic of the bicycle gearbox 400, only the four brakes B1, B2, B3 and B4 being actively engaged and disengaged. The four freewheel clutches F1, F2, F3 and F4 automatically change state when the bicycle gearbox 400 is in the driven state. By the bicycle gearbox 400, for example, twelve gears, each having a different ratio and being numbered as G1 through G12, can be provided. An overall gear ratio can be, for example, 3.77.

The engagement states for each gear are shown in the rows. For the brakes, dots indicate an engaged state, in which one element is to be connected to the stationary component for conjoint rotation and, therefore, rotationally fixed. A dash indicates a disengaged brake. For the freewheel clutches, a dash indicates an overrun operation state and a dot indicates a locking direction state. The ratio is indicated for each gear in the column labeled with "i." The overall gear ratio between two adjacent gears is indicated in the column labeled with "j." In each gear, those freewheel clutches switch to the overrun operation state, in which the brake having the corresponding number is engaged.

In gear G1, all four brakes B1, B2, B3, B4 are disengaged. Therefore, all four freewheel clutches F1, F2, F3, F4 are in the locking direction state.

In gear G2, the third brake B3 has been engaged. Therefore, the third freewheel clutch F3 has switched to the overrun operation state.

In gear G3, however, the fourth brake B4 has been engaged. Therefore, the fourth freewheel clutch F4 has switched to the overrun operation state.

In gear G4, the third brake B3 and the fourth brake B4 have been engaged. Therefore, the third freewheel clutch F3 and the fourth freewheel clutch F4 have switched to the overrun operation state.

In gear G5, only the first brake B1 is engaged. Therefore, only the first freewheel clutch F1 has switched to the overrun operation state.

In gear G6, the third brake B3 and the first brake B1 have been engaged. Therefore, the third freewheel clutch F3 and the first freewheel clutch F1 have switched to the overrun operation state.

In gear G7, the fourth brake B4 and the first brake B1 have been engaged. Therefore, the fourth freewheel clutch F4 and the first freewheel clutch F1 have switched to the overrun operation state.

In gear G8, the fourth brake B4, the third brake B3 and the first brake B1 have been engaged. Therefore, the fourth freewheel clutch F4, the third freewheel clutch F3 and the first freewheel clutch F1 have switched to the overrun operation state.

In gear G9, only the second brake B2 is engaged. Therefore, only the second freewheel clutch F2 has switched to the overrun operation state.

In gear G10, the third brake B3 and the second brake B2 have been engaged. Therefore, the third freewheel clutch F3 and the second freewheel clutch F2 have switched to the overrun operation state.

In gear G11, the fourth brake B4 and the second brake B2 have been engaged. Therefore, the fourth freewheel clutch F4 and the second freewheel clutch F2 have switched to the overrun operation state.

In gear G12, the fourth brake B4, the third brake B3 and the second brake B2 have been engaged. Therefore, the fourth freewheel clutch F4, the third freewheel clutch F3 and the second freewheel clutch F2 have switched to the overrun operation state.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

10; 100; 200 gear set arrangement
12; 112 planetary gear set
14; 114 sun gear
16; 116 planet carrier
18; 118 ring gear
20 inner set of planet gears
22 outer set of planet gears
24 stationary component
34 input
36 output
120 set of planet gears
150, 152 sun gear elements
250, 252 ring gear elements
400 bicycle gearbox
402 main gear set
410, 420 planetary gear sets
412, 422 sun gear
414, 424 planet carrier
416, 426 ring gear
418, 428 planet gears
434 hollow shaft
B1, B2, B3, B4 brakes
F1, F2, F3, F4 freewheel clutches
G1-G12 gears

The invention claimed is:

1. A gear set arrangement (10) for a planetary gearbox of a bicycle, comprising:
   a planetary assembly comprising an input (34), an output (36), and a planetary gear set (12) with a first rotary element, a second rotary element, and a third rotary element, the first rotary element is a sun gear (14);
   a stationary component (24);
   a first brake (B1);
   a second brake (B2);
   a first freewheel clutch (F1); and
   a second freewheel clutch (F2),
   wherein the first rotary element is rotationally fixable on the stationary component (24) by the first brake (B1), the first rotary element is connectable to the output (36) for conjoint rotation by the first freewheel clutch (F1), the second rotary element is rotationally fixable on the stationary component (24) by the second brake (B2), the second rotary element is connectable to the output (36) for conjoint rotation by the second freewheel clutch (F2), the third rotary element is permanently connected to the input (34) for conjoint rotation, and
   wherein the gear set arrangement (10) is configured to provide three ratios between the input (34) and the output (36).

2. The gear set arrangement (100; 200) of claim 1, wherein the planetary gear set (112) is a negative planetary gear set, the second rotary element is a ring gear (118), and the third rotary element is a planet carrier (116).

3. The gear set arrangement (10) of claim 1, wherein the planetary gear set (12) is a positive planetary gear set, the second rotary element is a planet carrier (16), and the third rotary element is a ring gear (18).

4. The gear set arrangement (100) of claim 2, wherein the sun gear (114, 150, 152) is divided.

5. The gear set arrangement (200) of claim 2, wherein the ring gear (118, 250, 252) is divided.

6. The gear set arrangement (10; 100; 200) of claim 1, wherein the first brake (B1) and the second brake (B2) are simultaneously actuatable in order to lock the planetary assembly.

7. The gear set arrangement (10; 100; 200) of claim 1, wherein the first freewheel clutch (F1) is configured to automatically switch to a locking direction state when the second brake (B2) is engaged.

8. The gear set arrangement (10; 100; 200) of claim 1, wherein the second freewheel clutch (F2) is configured to automatically switch to a locking direction state when the first brake (B1) is engaged.

9. A bicycle gearbox (400), comprising the gear set arrangement (10; 100; 200) of claim 1.

* * * * *